Dec. 16, 1969  L. A. PAUL ET AL  3,484,001
ARTICLE SORTING AND CONVEYING APPARATUS WITH ARTICLE INPUT
AND DISCHARGE STATIONS THAT FORMS THE SUPPORT
FOR THE CONVEYED ARTICLE
Filed June 30, 1967  5 Sheets-Sheet 4

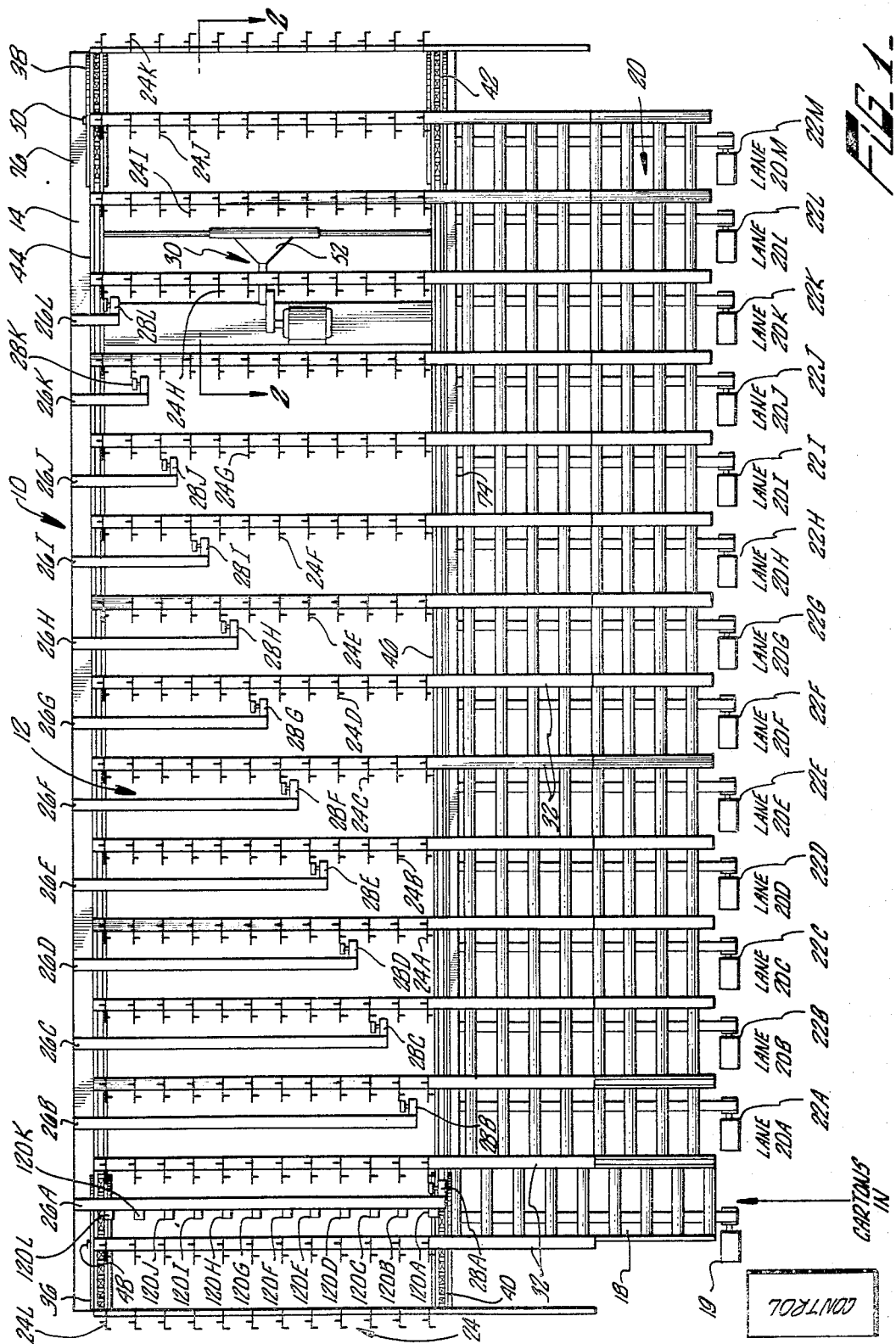

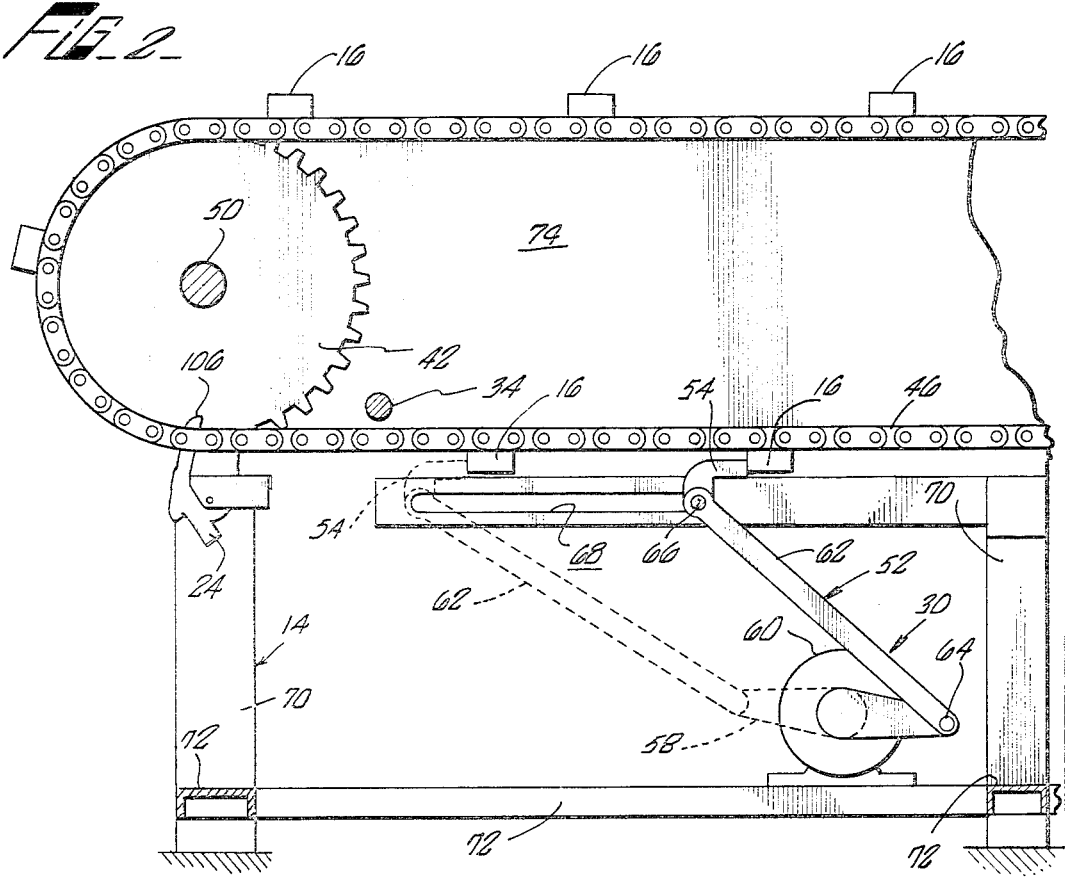
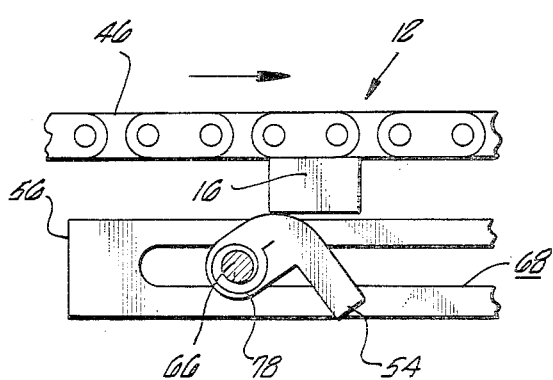

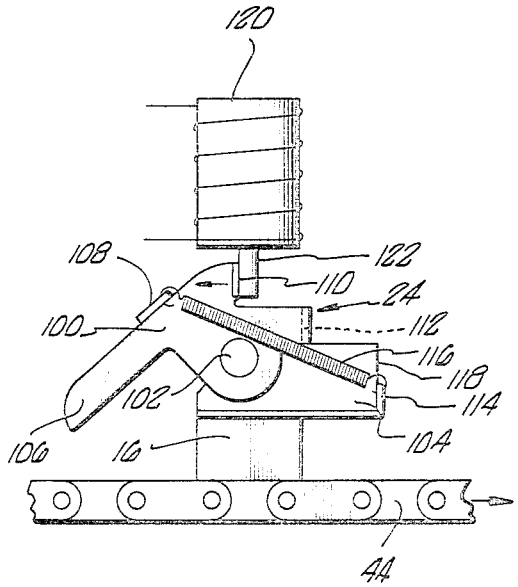
FIG_5.
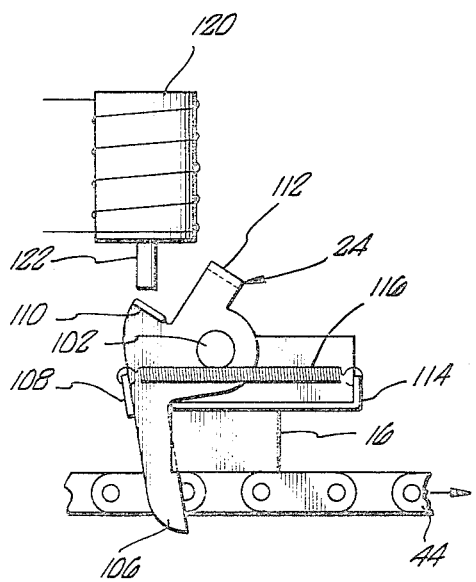
FIG_6.
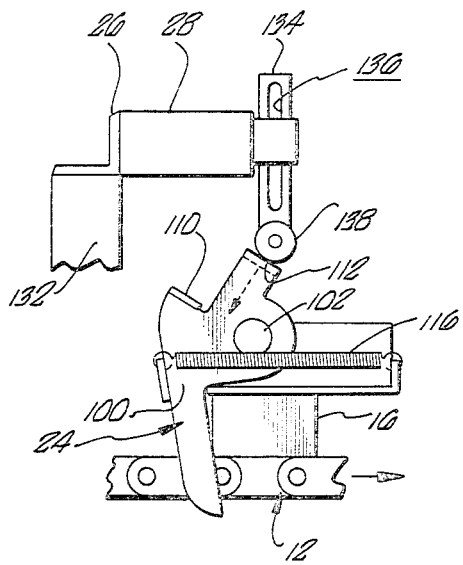
FIG_7.
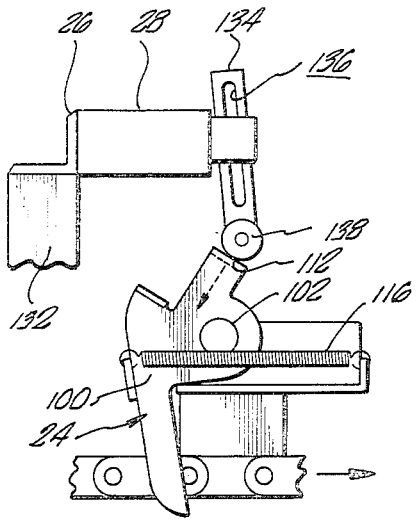
FIG_8.
INVENTORS.
LOWELL A. PAUL
LOYD ADAMS
BY
Christie, Parker & Hale
ATTORNEYS.

INVENTORS.
LOWELL A. PAUL
LOYD ADAMS
BY
Christie, Parker & Hale
ATTORNEYS.

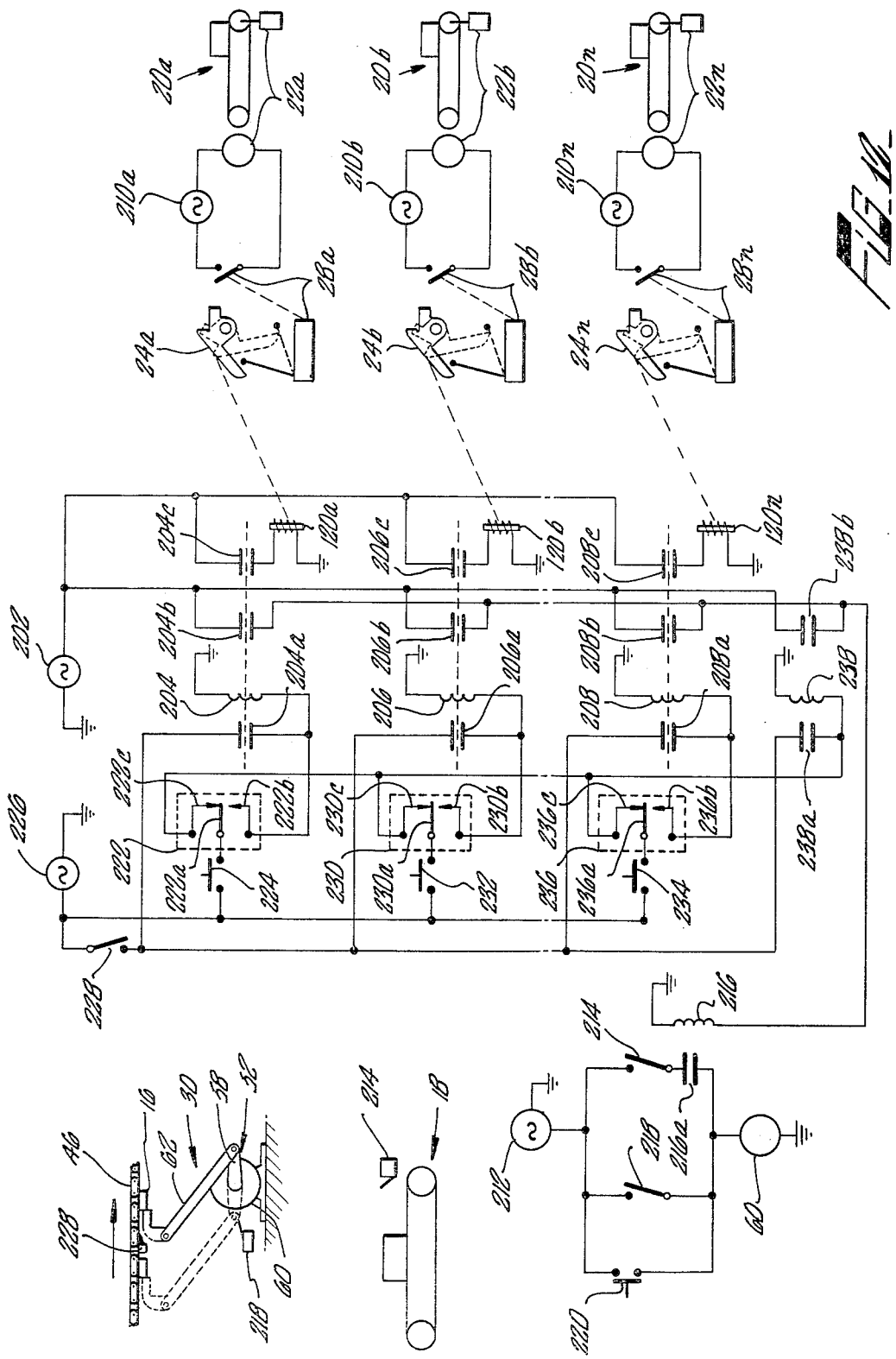

United States Patent Office 3,484,001
Patented Dec. 16, 1969

3,484,001
ARTICLE SORTING AND CONVEYING APPARATUS WITH ARTICLE INPUT AND DISCHARGE STATIONS THAT FORMS THE SUPPORT FOR THE CONVEYED ARTICLE
Lowell A. Paul and Loyd Adams, Pasadena, Calif., assignors to Aeroceanic Corporation, a corporation of California
Filed June 30, 1967, Ser. No. 650,428
Int. Cl. B65g 47/34, 43/00, 19/00
U.S. Cl. 214—11                                      13 Claims

ABSTRACT OF THE DISCLOSURE

The apparatus accepts articles of different classifications at an input station and transfers each of the articles to a selected one of a number of output stations where the article is discharged. An endless conveyer effects this transfer of articles by spaced-apart arms positioned to cross over the stations. The conveyer advances in steps with a pair of arms spanning a different station with each advance. The arms advance articles by pushing them across the stations. Article discharge is accomplished through an actuated control element on an arm to follow an article to its output station; the actuated control element energizes the station upon article arrival to effect its discharge. In order to have a continuous, uninterrupted flow of articles, a series of control elements are mounted on each arm with one element of each series corresponding to a given output station.

BACKGROUND OF THE INVENTION

This invention relates to the art of materials handling and, more particularly, to apparatus used for organizing randomly classed articles into distinct classifications.

There is a requirement in many industries to sort articles of many categories into distinct classifications. In the citrus industry, for example, fruit is packaged in cartons according to size and grade. The cartons arrive at a distribution center in random fashion where they must be organized into distinct classifications for distribution to the market place. Organization is typically accomplished in a system employing a conveyer for transporting different articles to a classification point where they are sorted and distributed on conveyers to accumulation stations.

One effective apparatus for sorting and distributing articles is described in U.S. Patent 3,044,638 to John K. Bruce. The patentee employs a continuously energized, endless conveyer from which cartons are discharged to individual accumulator conveyers. Articles are fed into the endless conveyer where each is temporarily held pending the selection of the desired accumulator conveyer and synchronization of an indicator with the article. When an indicator is set by an operator and synchronization effected, the article is released to continue down the conveyer for its discharge. Article discharge is accomplished through a load arm or pantograph roller system, either of which is energized by the set indicator at the desired accumulator conveyer. The indicators are in the form of individual arms each of which is frictionally journaled on a shaft. Cam rods at different elevations may be extended to intercept the indicators with each cam rod operable to set an indicator to a particular, arcuate orientation. This arm orientation determines which of a series of switches will be closed to energize the discharge apparatus associated with the selected accumulator conveyer.

Despite its sophistication, the patentee's materials handling apparatus is complex and sensitive. For proper operation of the Bruce apparatus, each indicator must maintain its arcuate orientation until it encounters the desired accumulator conveyer operating switch. The reliance on frictional engagement of the indicator with its journal, however, makes it difficult to maintain the requisite arcuate positioning with repeated use of the apparatus. In addition, the setting of the cam rods and indicators is critical because the arcuate angle of a given indicator must be held within narrow limits, particularly where several accumulator stations are used, to avoid transfer of an article at the wrong station. Moreover, each station selection must be accompanied by an arcuate synchronization between the article and its attendant indicator to avoid the possibility of article lead or lag with respect to its chosen output station. While some tolerance is possible when wide accumulator stations are employed, the advantage of compactness is lost if resort to this measure is taken. The use of pantograph rollers or load arms as transfer media, while effective, add cost and complicated structure to the apparatus.

SUMMARY OF THE INVENTION

The present invention provides an article classification and distribution apparatus which overcomes the above and associated problems.

In one form, the invention contemplates an apparatus which accepts articles at an input station where they are carried to any desired one of a number of output stations by arms on an endless conveyer. Articles, such as cartons, are carried by the arms by being pushed. At the output stations, the articles are discharged for accumulation or the like. The conveyer is operable to advance in steps a single station at a time with an article progressing from station to station as conveyer advance continues. Indicator means are coupled to the conveyer which are capable of being set to indicate the presence of a selected article at a desired output station and operate the output station to discharge the article.

In preferred form, the indicator means includes a plurality of control elements carried by the conveyer and disposed along spaced-apart lines. Each line contains an element for each of the output stations which is capable of selective actuation for operating its associated output station when a selected article arrives at the station. Each station is independent of the other stations and is controlled by switching means responsive to any of the actuated control elements associated with the station.

The control elements are preferably in the form of individual, bi-stable members pivotally mounted to the arms. The two stable positions of the member represent the elements' actuated and neutral states. Two tabs are diposed on the member in position to face the line of travel of the conveyer with a tab on either side of the member's axis. For actuation, the first of these tabs is capable of contacting an energized solenoid element to pivot the member into its alternate, actuated position by raising the second tab. The raised second tab is then in position to close the switching means at the member's associated output station. In its actuated state, the force acting on the second tab while it encounters the station activating switching means is directed above the member's pivot such that the member's orientation in its actuated position is maintained. Actuated control elements are reset by an arm provided on each of the members. The arm is disposed to encounter a reset bar positioned past the output stations which pivots the member back to its alternate, neutral position.

Each output station is preferably independent of its neighbors and operable only in response to one of its associated control elements. The output stations may be in the form of individual conveyers or energized rollers powered by an electric motor with the motor in circuit with the switching means controlled by the control elements associated with the particular output station.

The drive means for advancing the main conveyer in step-like fashion preferably includes a motor, a crank assembly and a dog or pawl. The pawl is adapted to engage each of the arms on the conveyer in turn and advance the conveyer through the engaged arm. The crank assembly couples the pawl to the motor. To maintain its position and provide linear travel, the pawl is constrained in a track. The distance between arms corresponds to the point-to-point distance between adjacent output stations in order that article advance will be by stations. The crank assembly is disposed relative to the pawl to effect slow pawl travel at either end of its course in the track with relatively fast pawl motion intermediate these end points.

In a more specific form the apparatus of this invention has the input and output stations to one side of the main conveyer's direction of travel. The arms carried by the conveyer extend over the input and output stations to carry the articles to their desired points of distribution again by pushing them along. The control elements are actuated by individual actuating means, such as solenoids, for each output station. Each actuating means is disposed on a bar in the path of its associated plurality of control elements. The actuation means are, in turn, energized by an operator through switch means which may be coupled to the actuated means by relays. Switch means are disposed at each station which energize each station upon contact with an actuated control element. These station energizing switches may be disposed on bars or the like above the conveyer. A limit switch or the like is in circuit with the main conveyer drive motor to prevent conveyer travel unless an article is in position at the input station to be carried by the arms to the desired output station. A second limit switch is disposed to prevent energization of the main drive motor in the event that the pawl is not in position to advance the conveyer when the article activated switch would otherwise close the circuit to the main drive. A third switch closes and maintains the main drive motor in circuit once it has been energized until a complete drive cycle has been completed. Switch means are also provided to effect the discharge of an article at a miscellaneous output station when the article does not fall into any of the classifications accorded to the remaining output stations. The miscellaneous station is preferably at the end of the output stations and energized at all times thereby eliminating the necessity of an additional control element.

The apparatus of the present invention provides a relatively simple and reliable means for classifying and distributing articles. Each article is carried a station at a time to its point of distribution by the conveyer arms. The station-to-station carriage of articles eliminates problems of article over or under travel with respect to its output station and provides a compact apparatus. Moreover, the station-to-station advance allows the use of very simple and reliable means for transferring articles from the conveyer to its point of distribution or accumulation by using the output station's conveyer or rollers as the mode of article release instead of pantograph rollers or load arms which must sweep the article from a continuously moving conveyer. In addition, the bi-stable control elements are very simple and positively set in either their actuated or neutral state with the result that output station energization is positive and timely. Moreover, the use of a plurality of control elements for each output station prevents inadvertent article discharge at the wrong location while maintaining rapid article handling because of the presence at any time of a control element to follow any of the classified articles.

These and other features, advantages and aspects of the invention will become more apparent from the following description, appended claims and drawings.

BRIEF DESCRIPTION OF THE DRAWINGS

FIGURE 1 is a plan view of the apparatus of the present invention;

FIGURE 2 is a partial elevational view of the apparatus shown in FIGURE 1 taken along line 2—2;

FIGURES 3 and 4 illustrate operation of the means shown in FIGURE 2 for effecting positive step-like advance of the conveyer of the invention;

FIGURES 5 and 6 illustrate a typical control element and the manner in which it is actuated;

FIGURES 7 and 8 illustrate the preferred mode of energizing a typical output station through an actuated control element;

FIGURE 12 depicts the control circuitry and its attendant actuating and controlled apparatus used in this invention.

DESCRIPTION OF THE PREFERRED EMBODIMENTS

Figure 9:
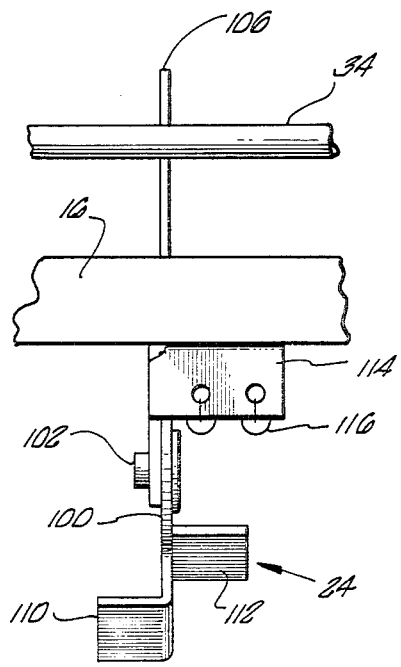
FIGURES 9 and 10 illustrate the manner in which a typical control element is reset to its neutral position after it has energized its associated output station.

FIGURE 1 illustrates the preferred article classification and distribution apparatus 10 of the present invention. The apparatus includes an endless, main conveyor 12 carried by a frame 14 which in turn carries a plurality of equally spaced arms 16. An input station 18, powered by a motor 19, is disposed to one side of the conveyer and parallel to a plurality of similarly disposed output stations 20. For purposes of clarity, the output stations are identified on FIGURE 1 as lanes 20A through 20M, inclusive. Lane 20M is a miscellaneous article discharge station. Each output station includes its own drive motor indicated generally by reference numeral 22 and particularly by the appropriate lettered subscript. A series of control elements 24 is mounted on each of the arms with the number of control elements in each series corresponding to the number of output stations less miscellaneous station 20M. Thus one control element of each series of cotnrol elements is associated with one of the output stations: lanes 20A through 20L. The control elements associated with each output station are indicated by the appropriate output station identifying letter; for example, element 24F is associated with ouput station or lane 20F. A pluraliy of spaced-apart bars 26 are mounted on the frame above conveyor 12 and spaced apart a distance corresponding to the point-to-point distance between stations. Each of the bars 26 mounts a limit switch 28 which is operated by an actuated control element. The number of bars and limit switches corresponds to the number of output lanes except lane 20M and each bar and limit switch is associated with a distinct output station. The association of bars and limit switches with the lanes is indicated by the subscript letter corresponding to the particular lane; thus bar 26J and limit switch 28J are associated with lane 20J. Drive means 30 on frame 14 advances the conveyor in step-like fashion from station to station. Extending portions 32 of arms 16 extend over the output stations and follow the movement of the conveyer. These lateral extensions of arms 16 carry articles from input station 18 to a selected one of the output stations. Reset bar 34 extends across frame 14 in position to reset any of the control elements 24 to its inactivated or neutral position from its actuated position.

Conveyor 12 includes two sprocket pairs constituted by sprockets 36 and 38 for one of the pairs and sprockets 40 and 42 for the other pair. Each sprocket pair carries an endless chain. Sprocket pair 36 and 38 carry chain 44 and sprocket pair 40 and 42 carry chain 46. Axle 48 connects sprockets 36 and 40 and axle 50 connects sprockets 38 and 42. The axles are journaled in frame 14. Chains 44 and 46 carry arms 16 which are attached to the chains and are spaced apart a distance corresponding to the distance between two similar points on two adjacent output stations. The arms circumscribe the entire length of chains 44 and 46 and extend outward into extending portions 32 over the output stations or lanes to carry articles.

FIGURE 2 depicts drive 30 for main conveyor 12 which includes crank assembly 52, pawl 54 and track 56. Crank assembly 52 includes crank throw 58 which is driven by motor 60 in a circular path. Connecting rod 62 is journaled through pin 64 to throw 58 to follow, at this journaled end, the circular path of the throw. Shaft 66 provides the other connection of connecting rod 62. Rod 62 is journaled on shaft 66 for rotation in response to throw 58. Shaft 66 is slidably engaged in slide 68 of track 56 for translation. Pawl 54 is pivotally carried by shaft 66. The length of translational travel of pawl 54 and shaft 66 corresponds to the distance between adjacent arms 16. This limit of travel is shown in FIGURE 2 as the distance between pawl 54 in phantom and pawl 54 in solid lines. The phantom and solid positions of pawl 54 also correspond to a half of crank assembly 52's cycle.

FIGURE 2 illustrates frame 14 and its disposition relative to drive assembly 30 and conveyor 12. Frame 14 includes a plurality of upright members 70 and horizontal braces 72. These uprights and braces are disposed to allow extended portions 32 of arms 16 to travel with the conveyor. For this purpose, the output station may provide support for conveyor 12 with some of the braces 72 and uprights 70 forming output station framing. Side plate 74 holds axle 50 and hence sprocket 42 and its carried chain 46. Side plate 76, seen in FIGURE 1, is similarly disposed for the support of complementary sprocket 38 and the latter's associated sprocket 36. The side plates are held in their elevated position by upright member 70 and rigidly connected together through braces 72.

FIGURES 3 and 4 depict in greater detail the action of pawl 54 in advancing conveyor 12. In FIGURE 3, pawl 54 is returning to its starting position in response to the action of crank assembly 52. Pawl 54 is biased by coil spring 78 which is attached to the shank of the pawl at one end and to shaft 66 at its other end. As the pawl attempts to reach its starting position, after advancing the conveyor one station, it encounters an arm 16 and depresses to the orientation shown in FIGURE 3. With further rearward travel of shaft 66 by crank assembly 52, the pawl will right itself into the position shown in FIGURE 4. In the FIGURE 4 position, the pawl urges against a vertical rear face of an appropriately positioned one of the arms 16 in preparation for the next conveyor advance. As was previously mentioned, the pawl is pivotally journaled on shaft 66 which in turn rides in slide 68 of track 56.

The preferred control element configuration is shown to best effect in FIGURES 5 through 10. Control element 24 includes bi-stable member 100 which is pivoted through pin 102 to mount or body 104. Body 104 is attached to one of the arms 16. Member 100 includes reset lever or arm 106, spring tab 108, reset tab 110 and actuating tab 112. As is more clearly shown in FIGURES 9 and 10, set tab 110 and actuating tab 112 extend laterally of the plane of member 100. Spring tab 108 also extends laterally of the plane of member 100 for cooperation with flange 114 in holding springs 116 in place. The two stable positions of control element 24 are shown in FIGURES 5 and 6. In FIGURE 5, the element is in its neutral state. In the neutral state, set tab 110 is oriented generally in the vertical and above actuating tab 112 which is also oriented in the vertical. Tab 112, in this position, bears against upright and lateral flange 118 for cooperation with springs 116 in maintaining the stable neutral state. In its actuated state, control eleemnt 24 takes the disposition shown in FIGURE 6. In this position, reset lever 106 extends below chain 44 for its ultimate contact with reset bar 34. Springs 116 are below pivot pin 102 and cooperate with reset lever 106 which bears against the horizontal portion of mounting support 104 to maintain the actuated condition stable. The actuated condition is further characterized by the orientation of set tab 110 and the actuating tab 112. Setting solenoid 120 is operable to extend armature 122 into the path of set tab 110 where it contacts the tab and pivots bi-stable member 100 about pivot point 102 to the position shown in FIGURE 6. Set tab 110 extends below extended armature 122 for free passage of control element 24 away from solenoid 120. Actuating tab 112 extends laterally away from the plane of member 100 in the opposite direction from tab 110 to avoid inadvertent contact with armature 122 of solenoid 120. As was previously mentioned, there is a setting solenoid for each of the output stations and hence for the plurality of control elements associated with each output station as shown in FIGURE 1.

FIGURES 7 and 8 depict an actuated control element as it encounters a limit switch used in controlling an output station. Limit switch 28 is mounted on transverse bar 26 which in turn is supported above conveyer 12 by upright 132. As is seen to best effect in FIGURE 1, each of the bars 26 extends transversely a different distance in order to encounter the control elements associated with the output station which the limit switch controls. Thus, for the output station denoted as lane 20A, the bar extends entirely across the width of conveyer 12 while the output station denominated as lane 20L extends only a short distance from its support on side plate 76. Limit switch 28 includes switching bar 134 which has an elongated channel 136 for its vertical adjustment with respect to control element 24. Switching bar 134 is pivotally connected to the body of limit switch 130. At the lower terminus of bar 134 is a roller 138 which is disposed in the path of actuating tab 112 when control element 24 is in an actuated state. Because of the opposite lateral orientation of actuating tab 112 from setting tab 110, the latter cannot encounter roller 138 and therefore operate limit switch 28. In any event, as control element 24 progresses along with conveyor 12, tab 112 encounters roller 138 to pivot bar 134 and close limit switch 28. In the position shown in FIGURE 8, actuated control element 24 has completed an advance and therefore limit switch 130 will remain closed pending the next advance of the control element, that is, tab 112 will continue its contact with roller 138. The force exerted by roller 138 on tab 112 is shown by the phantom line which passes above pivot point 102 to maintain bi-stable member 100 in its actuated state.

Figure 10:
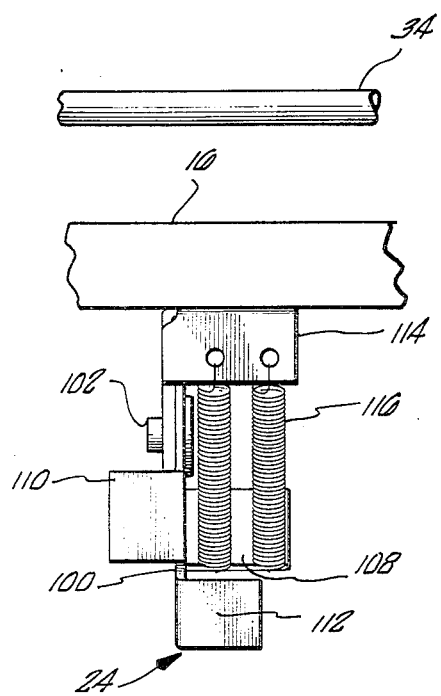

FIGURES 9 and 10 show the preferred means of neutralizing an actuated control element. Reset bar 34 expands the breadth of conveyer 12 in position to contact reset lever 106. This disposition is shown in FIGURE 2. As an actuated control element advances, control lever 106 will encounter reset bar 34 and pivot bi-stable member 100 about pivot point 102 into the position shown in FIGURES 5 and 10.

Figure 11:
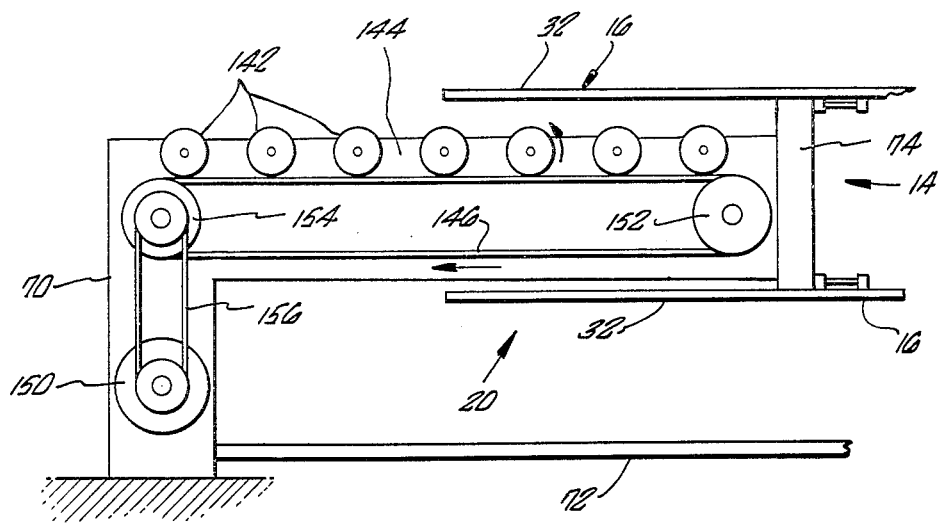
FIGURE 11 illustrates schematically a preferred output station.

FIGURE 11 depicts a typical output station configuration which is also typical of the configuration for input station 18 with the exception that the direction of roller motion is reversed. Each output station includes a portion of frame 14 and a plurality of rollers 142 rotatably journaled in cross brace 144 and a second cross brace (not shown) as through the illustrated axles. The top of cross brace 144 is below the upper peripheral surface of rollers 142 to allow arms 16 to push cartons from station to station. Endless belt 146 is driven by motor 150 and contacts each of the rollers 142 for their rotation. Endless belt 146 passes over idler shieve 152 and drive shieve 154. Drive shieve 154 is connected through belt 156 to motor 150. Extended portions 32 of arms 16 cross over each output station and return below each station. To provide room for the extended portions, side plate 74 is supported by cross brace 144. Upright 70 supports cross brace 144 and is disposed outwardly of extended portions 32. Brace 72, to provide arm clearance, extends below the path of the arms.

The preferred control circuit will now be described with reference to FIGURE 12. For purposes of clarity the circuit elements for all the output stations are not illustrated. However, each station is operated in a manner similar to the stations which will be described.

Each output station has its own setting solenoid for setting any one of the controlled elements associated with that particular output station. Thus, actuating solenoids 120a, 120b and 120n are connected in circuit to alternating source power supply 202. Each of these setting solenoids is wired in parallel with respect to the other solenoids to allow individual actuation. Solenoid 120a is in series with relay contact 204c of relay 204. These contacts are normally open and thus require the energization of relay 204 to complete the circuit to solenoid 120a. In like manner, solenoid 120b is controlled by relay 206 through its contacts 206c and setting solenoid 120n is in series with contacts 208c of relay 208.

Each of the setting solenoids controls an individual one of the control elements. Thus, solenoid 120a controls the actuation of control element 24a, solenoid 120b actuates control element 24b and solenoid 120n energizes control element 24n. Each of these control elements, in turn, controls one of the output stations. Output station 20a, which is controlled by control element 24a, includes a drive motor 22a. Drive motor 22a is in circuit with alternating current source 210a and limit switch 28a. Limit switch 28b, controlled by control element 24b, is in series circuit with alternating current source 210b and motor 22b of output station 20b. Finally, output station 20n includes drive 22n, which is in circuit with alternating current source 210n and limit switch 28n with the latter being controlled by control element 24n.

Main drive motor 60 is in circuit with alternating current source 212 through three parallel branches. The first parallel branch includes limit switch 214 which is disposed at the end of input station 18 to indicate when a box or other article is in position to be carried to its desired output station. Limit switch 214 is in series circuit with contacts 216a or relay 216. The second parallel branch of the main drive circuit includes limit switch 218 which is controlled by crank assembly 52 such that it closes the circuit between alternating current source 212 and motor 60 through its branch upon the energization of the motor and opens upon the completion of a 360° cycle by motor 60. The final branch of the drive circuit includes cleanout switch 220 which allows the motor to cycle when the other branches of the circuit are open to complete the discharge of articles despite the absence of an article bearing against limit switch 214.

Relay 216 is in circuit with alternating current source 202 through relay contacts 204b, 206b and 208b. Each of these contacts is respectively controlled by relays 204, 206 and 208. Contacts 204b, 206b and 208b are wired in parallel to allow actuation of relay 216 when any of the relays 204 through 208 are energized.

Relay 204 is in series with operator control switch 222 which in turn is connected in series with selector button 224. Selector button 224 is connected directly to alternating current source 226. Switch 222 is a single pole, double throw switch to provide flexibility of article classification and discharge as will subsequently be described. When pole piece 222a is in contact with element 222b a circuit is established through selector button 224 to the coil of relay 204. Contacts 204a of relay 204 are connected in series with alternating current source 226 through limit switch 228. Limit switch 228 is normally closed and positioned to be controlled by any one of the arms 16 such that it opens when the conveyer begins its travel and closes when a subsequent arm is brought into contact with its switching element at the end of a given step advance of conveyer 12. In like manner the coil of relay 206 is connected in series with control switch 230, selector button 232, and alternating current source 226. Switch 230 includes pole piece 230a which, at the behest of an operator, may be positioned between poles 230b and 230c. Relay contacts 206a are wired in series with the coil of relay 206 and through limit switch 228 to alternating current source 226. Control of lane N is effected through selector button 234 which is wired to pole piece 236a of control switch 236. Pole 236b is wired in series with the coil of relay 208 while relay contacts 208a are wired in series circuit with the coil of relay 208 and again through limit switch 228 to alternating current source 226.

Poles 222c, 230c and 236c of switches 222, 230 and 236, respectively, are wired in parallel with each other and in series with the coil of relay 238. Relay 238 as well as the last mentioned poles form the control for output station or lane 20M which, as was previously mentioned, constitutes a miscellaneous article discharge lane or station. Relay contacts 238a are in series circuit with limit switch 228 and alternating current source 226 while relay contacts 238b are wired in parallel with contacts 204b, 206b and 208b and in series with the coil of relay 216.

OPERATION

The operation of the apparatus of the present invention will now be described. This description will in general refer to FIGURES 1 and 12.

An article such as a carton enters input station 18 by the action of its drive motor 19 where it contacts limit switch 214 to close the switch in preparation for the actuation of motor 60 of drive 30. The carton is then properly indexed with respect to arms 16 and conveyer 12. If an operator selects output station 20b, he will depress selector button 232 to establish a circuit to control switch 230. If pole piece 230a is against pole 230b, a circuit will be completed through the coil of relay 206 to ground. The relay then closes its contacts 206a, 206b and 260c. When contacts 206c close, setting solenoid 120b is in circuit with alternating current source 202 and therefore it will energize and extend its armature. The extended armature of solenoid 120b will encounter the set tab of control element 24b of the particular control element to its immediate rear upon forward travel of the conveyer (as illustrated to best effect and previously described with reference to FIGURES 5 and 6). The closure of contacts 206b establishes a circuit from alternating current source 202 to relay 216 which closes contacts 216a and establishes a circuit between alternating current source 212 and drive motor 60 because limit switch 214 is closed by an article in position on input station 18. Motor 60 will then begin to revolve, whereupon limit switch 214 opens. However, limit switch 218 closes upon energizing motor 60 because crank assembly 52 no longer bears against the latter's switching element. The motor will continue to be energized until limit switch 218 again opens to bring an individual one of the arms 16 by pawl 54 forward and a trailing arm to the position just occupied by the driven arm. When the trailing arm is brought forward the motor has completed one-half its cycle. However, limit switch 218 remains closed and the motor continues to rotate to bring crank assembly 52 into position to drive the trailing arm forward upon the next closure of switch 214 and lane selection. Upon completing a 360° cycle for motor 60, limit switch 218 opens through contact with crank assembly 52.

The course of events just described will continue so long as articles are fed by input station against limit switch 214 until the article selected for station 20b reaches station 20b, by being pushed by the trailing of the arms spanning it, whereupon the actuated switching element 24b will close limit switch 28b energizing motor 22b to discharge the article. The action of the switching elements and limit switches was described with reference to FIGURES 7 and 8.

In the event that an operator closes selector button 232 when pole piece 230a is in contact with pole 232c, the article will ultimately reach output station 20M for discharge. This occurs because the coil of relay 238 is energized and its contacts 238b are closed which energizes the coil of relay 216 and closes contacts 216a to advance the conveyer one station. Switches 222, 230 and 236, then, provide a means for selecting the miscellaneous article lane and, as such, greater article handling flexibility. The enhanced flexibility is illustrated when there are twenty-four categories of articles, only twelve of which are desired to be classified at one time. By providing twenty-four switches of the type illustrated by switches 222, 230 and 236, with each switch corresponding to a given article and twelve switches connected in circuit to the output stations, articles destined for a particular output station will respond to the actuation of the appropriate selector button, while articles destined for the miscellaneous station will also automatically reach their station upon depression of the selector button corresponding to their classification because a circuit to relay 216 is established through relay 238.

When article supply on input station 18 is suspended while articles are being transported by conveyer 12, clean-out button 220 is depressed to close the circuit to motor 60. The motor will then continue to cycle and articles discharged despite the fact that switch 214 remains open.

What is claimed is:

1. An apparatus for collecting, sorting and discharging cartons and the like comprising:
  (a) a frame;
  (b) an endless conveyer on the frame;
  (c) a carton input station having conveyer means for transporting cartons towards the endless conveyer;
  (d) a plurality of side-by-side carton output stations disposed adjacent the input station, each output station having a selectively operable conveying means for transporting cartons away from the endless conveyer in a substantially horizontal plane, the input and output station conveying means defining a substantially continuous carton support to one side of and along the endless conveyer, the input and output station conveying means forming the sole support for cartons along the continuous carton support, the station-to-station distance between the input station and the closest output station and between adjacent output stations being substantially equal;
  (e) drive means operable to advance the endless conveyer in step-like fashion a distance equal to the station-to-station distance;
  (f) a plurality of arms affixed to the endless conveyer, the arms extending in parallel equally spaced relationship with one another such that they pass over the continuous carton support formed by the conveying means of the input and output stations with adjacent arms successively spanning each station as the endless conveyer advances, the direction of movement of the input and output conveying means towards and away from the endless conveyer, respectively, being parallel to the arms, whereby cartons disposed between arms advance to desired output stations on the output conveying means thereof a station at a time by being pushed by the arms;
  (g) a plurality of selectively actuatable indicator means on each of the arms, each arm having an indicator means for each output station, each of the indicator means being capable of selective actuation;
  (h) means for selectively actuating each of the indicator means; and
  (i) means at each of the output stations responsive to an actuated indicator means associated therewith to operate the output station's conveying means and remove a carton from between the arms.

2. The apparatus claimed in claim 1 wherein:
  (a) each of the indicator means includes a bi-stable element having stable positions corresponding to an actuated position and a neutral position;
  (b) the responsive means includes switch means at each output station operably disposed to be engaged by an actuated bi-stable element to operate the conveying means of an associated output station; and
  (c) reset means is provided to reset actuated bi-stable elements to their neutral position after such elements pass the output stations.

3. The apparatus claimed in claim 2 wherein:
  (a) each bi-stable element is pivotally mounted to its associated arm for pivotal movement between its actuated and neutral positions;
  (b) first and second stop means are provided for each of the bi-stable elements to bear against in its actuated and neutral positions; and
  (c) over-center spring means couple each bi-stable element to its associated arm such that each element is maintained in its neutral position until actuated and in its actuated position thereafter.

4. The apparatus claimed in claim 3 wherein:
the resetting means includes a bar disposed across the line of movement of the endless conveyer after the output stations; and
each bi-stable element includes a resetting arm oriented to encounter the resetting bar in the actuated position to pivot the bi-stable element into its neutral position.

5. The apparatus claimed in claim 3 wherein:
  (a) the bi-stable elements for each output station are oriented in a line parallel to the line of movement of the endless conveyer;
  (b) the actuating means includes a displaceable element for each output station disposable in the path of each output station's bi-stable elements; and
  (c) each bi-stable element includes a set tab and an actuating tab, the set tab being oriented to be engaged by the displaceable element of the associated actuating means and rotate the bi-stable element into its actuated position, the actuating tab being disposed in the actuated position to engage the switch means of the associated responsive means and in the neutral position to pass clear of such switch means.

6. The apparatus claimed in claim 5 wherein the actuator tab is disposed in the actuated position such that the force exterted on it by the switch means is directed in relation to the pivot to maintain the actuated position.

7. The apparatus claimed in claim 5 wherein the actuating means for each bi-stable element includes a solenoid, the displaceable elements being the armature of the solenoids.

8. The apparatus claimed in claim 6 including:
means associated with the conveyer drive means to prevent operation thereof until a carton is in position on the input station to be carried to an output station by the arms; and
means associated with the conveyer drive means to maintain such drive means operating for a one-station advance of the conveyer and to terminate operation after such an advance.

9. The apparatus claimed in claim 8 including:
a miscellaneous output station disposed at the end of the other output stations opposite the input station; and
miscellaneous carton switch means associated with the conveyer drive means to operate such means when a miscellaneous carton is in position on the input station to be carried to the miscellaneous output station.

10. The apparatus claimed in claim 1 wherein:

(a) each of the indicator means includes a bi-stable element each of the bi-stable elements being disposed to face the line of movement of the endless conveyer, the bi-stable elements for each output station being oriented in a line parallel to the line of movement of the endless conveyer;

(b) each bi-stable element is pivotable about a pivot axis between its stable positions, the alternate stable positions corresponding to an actuated position and a neutral position, the pivot axis being normal to the line of movement of the endless conveyer;

(c) each bi-stable elements has a set tab and an actuator tab facing the line of movement of the endless conveyer and being on opposite sides of the bi-stable element;

(d) each set tab is in position to be engaged and pivot its bi-stable element into its actuated position;

(e) each actuator tab is disposed to occupy a position relatively elevated from its neutral position when its bi-stable element is in its actuated position;

(f) the means for selectively actuating the indicator means includes an extendible setting element for each output station and means for selectively extending the extendible element into a setting position in the path of the set tabs of the bi-stable elements of such output station and pivoting such bi-stable elements into their actuated position;

(g) the responsive means of each output station includes switch means operable when actuated to operate its output station's conveying means, the switch means for each output station being disposed in the path of the actuator tabs of actuated bi-stable elements associated with such output station to be actuated thereby; and (h) means for resetting actuated bi-stable elements to their neutral position after such bi-stable elements pass the output stations.

11. The apparatus claimed in claim 10 wherein:

(a) means is provided including over-center spring means for coupling each bi-stable element to the endless conveyer such that the bi-stable elements are maintained in their neutral position until actuated and in their actuated position thereafter; and (b) the resetting means includes a bar disposed across the line of movement of the endless conveyer after the output stations, and a resetting arm on each bi-stable element disposed when its bi-stable element is actuated to engage the bar and pivot its bi-stable element into its neutral position.

12. The apparatus claimed in claim 10 wherein the actuator tab of each bi-stable element is disposed in the actuated position thereof such that the force exerted on it by the switch means is directed in relation to the pivot of its bi-stable element to maintain the actuated position as the endless conveyer advances in relation to such switch means.

13. The apparatus claimed in claim 12 wherein the actuating means for each bi-stable element includes a solenoid, the extendable setting elements being the armature of the solenoids.

References Cited

UNITED STATES PATENTS

| | | | |
|---|---|---|---|
| 1,831,158 | 11/1931 | Burkert | 214—11 |
| 2,529,777 | 11/1950 | McInnis | 198—135 |
| 2,600,869 | 6/1952 | Harkness et al. | 198—135 |
| 2,969,137 | 1/1961 | Baumann et al. | 198—38 |
| 2,979,183 | 4/1961 | Capanna | 198—38 |
| 3,044,638 | 7/1962 | Bruce | 198—38 |
| 3,384,250 | 5/1968 | Vanhentenrijk | 214—11 |

FOREIGN PATENTS

| | | |
|---|---|---|
| 561,140 | 7/1958 | Canada. |
| 1,234,149 | 2/1967 | Germany. |

GERALD M. FORLENZA, Primary Examiner

RAYMOND B. JOHNSON, Assistant Examiner

U.S. Cl. X.R.

198—171

PO-1050
(5/69)

UNITED STATES PATENT OFFICE
CERTIFICATE OF CORRECTION

Patent No. __3,484,001__    Dated __December 16, 1969__

Inventor(s) __L. A. Paul et al__

It is certified that error appears in the above-identified patent and that said Letters Patent are hereby corrected as shown below:

In the specification: Column 1, line 24, after "element" insert --mounted--. Column 2, line 12 "arcuate" should be --accurate--; line 19, "add" should be --adds--; line 52, "diposed" should be --disposed--. Column 4, line 43, "cotnrol" should be --control--; line 60, "conveyor" should be --conveyer-- line 63, "conveyor" should be --conveyer--; line 69, "conveyor" should be --conveyer--. Column 5, line 8, "conveyor" should be --conveyer--; line 26, "conveyor" should be --conveyer--; line 30 "conveyor" should be --conveyer--; line 31, "conveyor" should be --conveyer--; line 41, "conveyor" should be --conveyer--; line 47 "conveyor" should be --conveyer--; line 54, "conveyor" should be --conveyer--. Column 6, line 1, "eleemnt" should be --element--.

In the claims: Claim 6, column 10, line 51, "exterted" should be --exerted--. Claim 10, column 11, line 13, "elements" should be --element--. Claim 13, column 12, line 20, "extendable should be --extendible--.

SIGNED AND
SEALED

JUL 14 1970

(SEAL)
Attest:

Edward M. Fletcher, Jr.
Attesting Officer

WILLIAM E. SCHUYLER, JR.
Commissioner of Patents